US012201993B2

(12) United States Patent
Lane

(10) Patent No.: US 12,201,993 B2
(45) Date of Patent: Jan. 21, 2025

(54) GOLD PAN AND METHOD OF USE THEREOF

(71) Applicant: Brenton A. Lane, Santa Clarita, CA (US)

(72) Inventor: Brenton A. Lane, Santa Clarita, CA (US)

( * ) Notice: Subject to any disclaimer, the term of this patent is extended or adjusted under 35 U.S.C. 154(b) by 0 days.

(21) Appl. No.: 18/483,851

(22) Filed: Oct. 10, 2023

(65) Prior Publication Data

US 2024/0131527 A1 Apr. 25, 2024
US 2024/0226914 A9 Jul. 11, 2024

Related U.S. Application Data

(60) Provisional application No. 63/417,457, filed on Oct. 19, 2022.

(51) Int. Cl.
*B03B 5/02* (2006.01)

(52) U.S. Cl.
CPC .................................... *B03B 5/02* (2013.01)

(58) Field of Classification Search
CPC ........................................................ B03B 5/02
See application file for complete search history.

(56) References Cited

U.S. PATENT DOCUMENTS

| | | | | |
|---|---|---|---|---|
| 1,972,645 A * | 9/1934 | Danills | B03B 5/26 | 209/447 |
| 4,289,241 A | 9/1981 | Litrap | | |
| 4,319,994 A | 3/1982 | Morgan | | |
| 5,190,158 A * | 3/1993 | Remias | B03B 5/02 | 209/397 |
| 5,868,366 A | 2/1999 | Tubbs, Jr. | | |
| 6,095,342 A * | 8/2000 | Ashcraft | B03B 5/02 | 209/490 |
| D475,727 S | 6/2003 | Kelava | | |
| 9,662,662 B1 * | 5/2017 | Weaver | B03B 5/58 | |
| 9,676,002 B2 | 6/2017 | Guillemin | | |
| 2017/0348701 A1 * | 12/2017 | Washburn | B03B 5/06 | |
| 2018/0071749 A1 * | 3/2018 | Martori | B03B 5/74 | |

* cited by examiner

*Primary Examiner* — Jacob S. Scott
*Assistant Examiner* — Miraj T. Patel
(74) *Attorney, Agent, or Firm* — Brennan, Manna & Diamond, LLC

(57) ABSTRACT

The present invention is a novel gold pan and associated method for improved yield of gold during the panning process. The gold pan has a continuous curved sidewall and a base, wherein the curved sidewall and the base are used for collecting gold. A portion of the curved sidewall has a plurality of ripples, each ripple having a ridge, an extending lip, and a cavity, the cavity is used for trapping black sand and gold particles, wherein a vortex of mixture of water, gravel, sand and more is produced in the pan and upon circulating and repeating of the pan, the gravels and blonde sand is rinsed out while leaving the black sand including the gold behind. The process does not require a user to keep looking in the pan during the panning process and improves the yield of the gold or other gemstones being panned.

17 Claims, 4 Drawing Sheets

GOLD PAN AND METHOD OF USE THEREOF

CROSS-REFERENCE TO RELATED APPLICATION

The present application claims priority to, and the benefit of, U.S. Provisional Application No. 63/417,457, which was filed on Oct. 19, 2022, and is incorporated herein by reference in its entirety.

FIELD OF THE INVENTION

The present invention relates generally to the field of panning gold. More specifically, the present invention relates to a novel gold pan and associated method for effective and improved panning of gold with increased yield. The pan has a plurality of ridges for trapping black sand while other sand and gravels are rinsed off upon circulating and repeating. The pan enables users to submerge the pan in water and gravels, creates a vortex by mixing material and water together, then rinses off the top layer of blonde sand until all black sand containing gold is visible. Accordingly, the present disclosure makes specific reference thereto. Nonetheless, it is to be appreciated that aspects of the present invention are also equally applicable to other like applications, devices, and methods of manufacture.

BACKGROUND

By way of background, gold panning is a form of placer mining and traditional mining that extracts gold from a placer deposit using a pan. The method involves separating particles of greater specific gravity from soil, gravels, and the like by washing same in the pan with water. In fact, gold panning is the final process of the individual prospector for recovering gold, diamonds, and gemstones in alluvial deposits. Currently, users are required to continuously look at the pan while performing gold panning until the process is done. The process generally takes a long time and keeps users looking in the gold pan before the complete process is complete.

Generally, some of the gold pieces are also rinsed off while the user tries to rinse off the heavier rocks and gravels. Further, black sand gets mixed with blonde or brown sand making the process ineffective and time consuming. People desire an improved pan and associated method for improving yield of the gold from the panning process. Conventional method and pans do not follow a large to small rinsing off principle, thereby rinsing off black sand as well, resulting in loss of gold items in the panning process.

Therefore, there exists a long-felt need in the art for a gold pan that keeps users from looking in the pan before the complete process is done. There is also a long-felt need in the art for a gold pan that makes large sand rise and small sand drop down enabling better yield of gold. Additionally, there is a long-felt need in the art for a novel gold pan that eliminates the worry of excess rocks and brown sand pushing gold out of the gold pan. Moreover, there is a long-felt need in the art for a gold pan that helps in rinsing off all sands except black sand easily and quickly. Further, there is a long-felt need in the art for a gold pan that works like conventional gold pans and identifies gold within rocks and sands. Finally, there is a long-felt need in the art for a gold pan and associated method that offers the best way for people to easily improve their yield when looking for gold in the field.

The subject matter disclosed and claimed herein, in one embodiment thereof, comprises a gold panning pan. The pan helps in implementing a standardized gold panning process and improved yield of gold. The pan is configured to receive a mixture of sand, gravel, and gold by submerging the pan in water, the pan having a continuous curved sidewall having a rim and a base, a portion of the curved sidewall having a plurality of ridges, each ridge formed by a lip and having a cavity for functioning as a low pressure housing, wherein the pan is rotated or circulated to remove gravels and blonde sand while leaving black sand along with gold onto or towards the base. The other items are also rinsed off or are removed for a better yield of gold.

In this manner, the improved gold panning pan of the present invention accomplishes all of the forgoing objectives and provides users with an improved circular pan for identifying gold within rocks and sands and offers the best way for people to easily improve their yield when looking for gold in the field. The pan, on circulating, removes blonde sand and only black sand is left which has the gold. The pan can be easily repeating removing large rocks first revealing gold.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a gold panning pan. The pan is configured to receive a mixture of sand, gravel, and gold by submerging the pan in water, the pan having a curved sidewall and a base, a portion of the curved sidewall having a plurality of ridges, each ridge formed by a lip and having a cavity for functioning as a low pressure housing, wherein the pan is rotated circularly to remove gravels and leave black sand along with gold onto or towards the base. The other items are rinsed off.

In yet another embodiment, the gold pan is made from one of polypropylene, plastic, and metal.

In yet another embodiment, the gold pan is used for separating lighter material from heavier material.

In another aspect of the present invention, the pan is available in different colors and sizes.

The subject matter disclosed and claimed herein, in one embodiment thereof, comprises a method of gold panning. The method comprising the steps of providing a gold pan having a curved sidewall and a base, the curved sidewall having a plurality of riffles, each riffle having a lip and a cavity, submerging the pan in water, creating a vortex of dirt, gold, and other material with water in the pan, circulating and repeating the pan to shake off rocks and blonde sand, disposing black sand along with gold onto or towards the base and retrieving the gold from the pan.

In yet another embodiment, the method comprising the step of removing rocks and gravels from the pan and trapping black sand and gold in the riffles of the pan.

In yet another embodiment, a method for panning for gold is described. The method comprising the steps of making a vortex of water, gravels, rocks, and gold; constantly repeating the vortex; rinsing off large rocks and gravels; disclosing black sand and revealing gold onto or towards the base of the pan used for the panning of gold.

In yet another embodiment, the gold pan of the present invention is easily and efficiently manufactured, marketed and available to consumers in cost-effective manner and is easily used by users for panning gold with increased yield.

Numerous benefits and advantages of this invention will become apparent to those skilled in the art to which it pertains upon reading and understanding of the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

Figure 1:
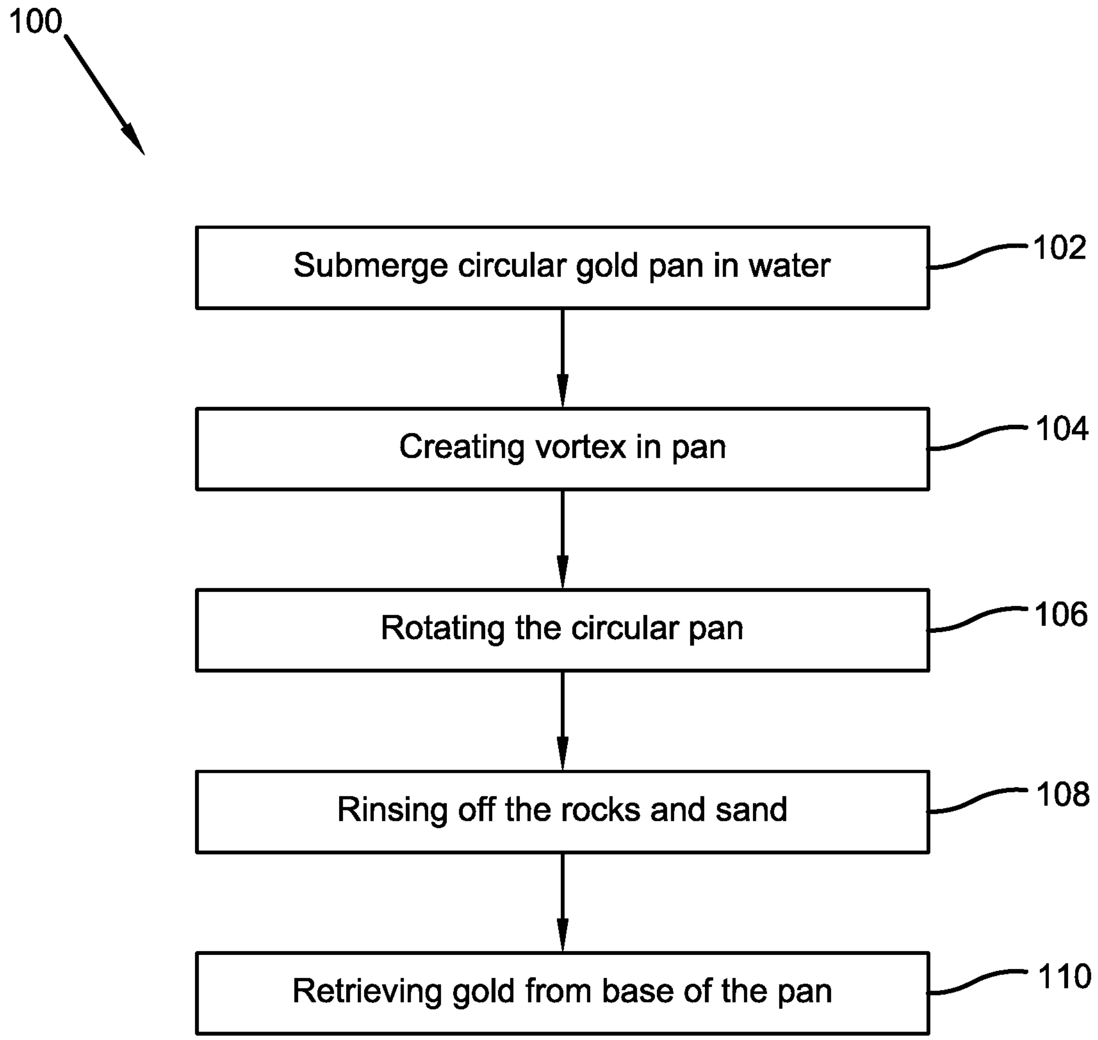
FIG. 1 illustrates a flow diagram depicting a process of optimized gold panning of the present invention in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long-felt need in the art for a gold pan that keeps users from constantly looking into or observing the pan before the complete process is done. There is also a long-felt need in the art for a gold pan that makes large sand rise and small sand drop down enabling better yield of gold. Additionally, there is a long-felt need in the art for a novel gold pan that eliminates the worry of excess rocks and brown sand pushing gold out of the gold pan. Moreover, there is a long-felt need in the art for a gold pan that helps in rinsing off all sands except black sand easily and quickly. Further, there is a long-felt need in the art for a gold pan that works like conventional gold pans and identifies gold within rocks and sands. Finally, there is a long-felt need in the art for a gold pan and associated method that offers the best way for people to easily improve their yield when looking for gold in the field.

The present invention, in one exemplary embodiment, is a method of gold panning. The method includes the steps of providing a gold pan having a curved sidewall and a base, the curved sidewall having a plurality of riffles, wherein each riffle having a ridge, or a lip, and a cavity, submerging the pan in water, creating a vortex of dirt, gold, and other material with water in the pan, circulating and repeating the pan to rinse off rocks and blonde sand, exposing black sand along with gold onto or towards the base and retrieving the gold from the pan.

Referring initially to the drawings, FIG. 1 illustrates a flow diagram depicting a process of optimized gold panning of the present invention in accordance with the disclosed architecture. The optimized gold panning process 100 of the present invention is designed to optimize the process of panning for gold for identifying gold within rocks and sands. More specifically, initially, a circular gold pan is submerged in water and gravels to collect a mixture thereof in the pan (Step 102). Any natural source like a lake, river, and the like or water collected in a bucket, tub, and the like can be used for submerging the circular pan. Then, the pan is raised out of the water with the material in the pan kept in a semi-liquid state and a vortex is created by constantly mixing gravel and water together in the circular pan (Step 104). Thereafter, the circular pan is filled with water to rinse off large rocks and blonde sand (Step 106). The circular pan can be rotated easily without requiring a user to constantly look at the circular pan. The circulating of the pan can be done from rotating with hand, using a circular motion.

The constant circulating and rinsing off results in separating and disclosing of black sand in the pan (Step 108). Finally, the last vortex includes only black sand and is centered in a corner at the riffles starting point. Then, with a new 'center' of material, fast and smaller circles of sand and water are 'jigged' down by timing the water waves at the 'center'. Gold will then start to appear each time the wave water circles arrive at the 'center' of the vortex. The gold will then be trained in the vortex 'center'. Finally, the gold is located at the center of the vortex and can be retrieved using a snuffer bottle by hands by the user (Step 110). The method of the present invention eliminates the worry of excess rocks and brown sand pushing gold out of the collection area of the pan. It should be appreciated that the panning is performed until a few tablespoons of the black sand is left for easily identifying the gold.

Figure 2:
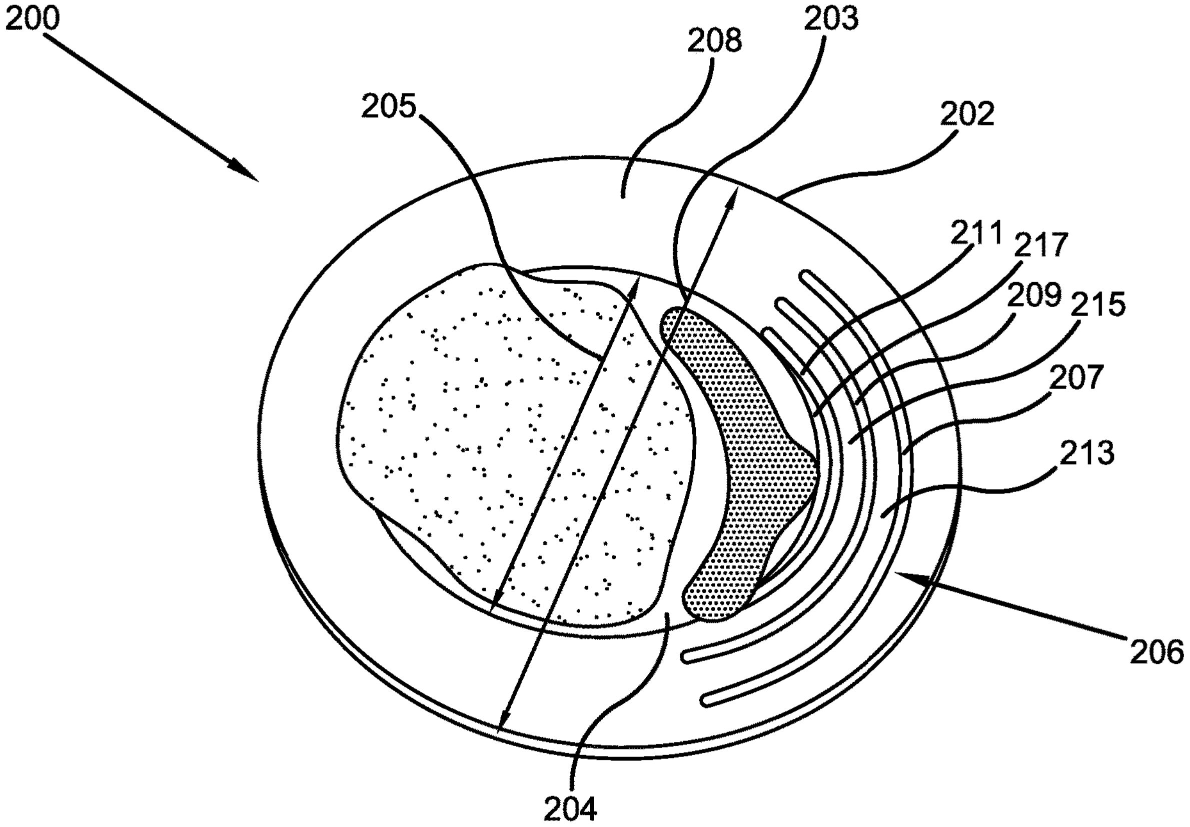
FIG. 2 illustrates a standalone view of a circular gold panning pan of the present invention in accordance with the disclosed architecture.

FIG. 2 illustrates a standalone view of the circular gold panning pan of the present invention in accordance with the disclosed architecture. The pan 200 is an improved pan and is used in the method disclosed in the present invention. The gold panning pan 200 can be made of any durable material including but limited to polypropylene, metal, plastic, and more. The pan 200 has an outer or rim diameter 203 from about 36 cm to about 44 cm and has a base diameter 205 from about 16 cm to about 24 cm. The ratio of the outer or rim diameter 203 with the base diameter 205 is from 2.75 to 1.50. The pan 200 has a sidewall 208 including a height in the range of 7 cm to 10 cm in different variants for accommodating different volumes of the vortex.

The gold pan 200 can be used in traditional gold washing and separating the gold from the sand, alluvial, river sand gold mine from streams. More specifically, the gold pan 200 has a plurality of riffles 206 for helping trap the heavier gold while enabling rocks, sand, and other material to be washed out or rinsed during the gold panning process. In one exemplary arrangement, the plurality of riffles 206 include three ridges 207, 209, 211 and three cavity areas 213, 215, 217, respectively. The plurality of riffles 206 are formed along a portion of the curved sidewall 208 of the pan 200 and form low pressure pockets or cavities 213, 215, 217 for effective collection of gold. It should be appreciated that gold has a weight (specific gravity is 19.3 in the water) that is greater than a weight of the dirt or sand such that during circulating of the pan 200, the gold is urged off of the plurality of riffles 206 to be deposited onto or towards the base 204 while the dirt remains on the plurality of riffles 206. The plurality of ridges 207, 209, 211 are oriented as parallel curves or offset curves that are equidistant from one another. The plurality of ridges 207, 209, 211 include a curvilinear length of extension from about 25 percent to about 50 percent around a circumference of the curved sidewall 208 of the pan 200. In another embodiment the plurality of ridges 207, 209, 211 include a curvilinear length of extension from about 30 percent to about 40 percent around the circumference of the curved sidewall 208 of the pan 200.

Figure 3:
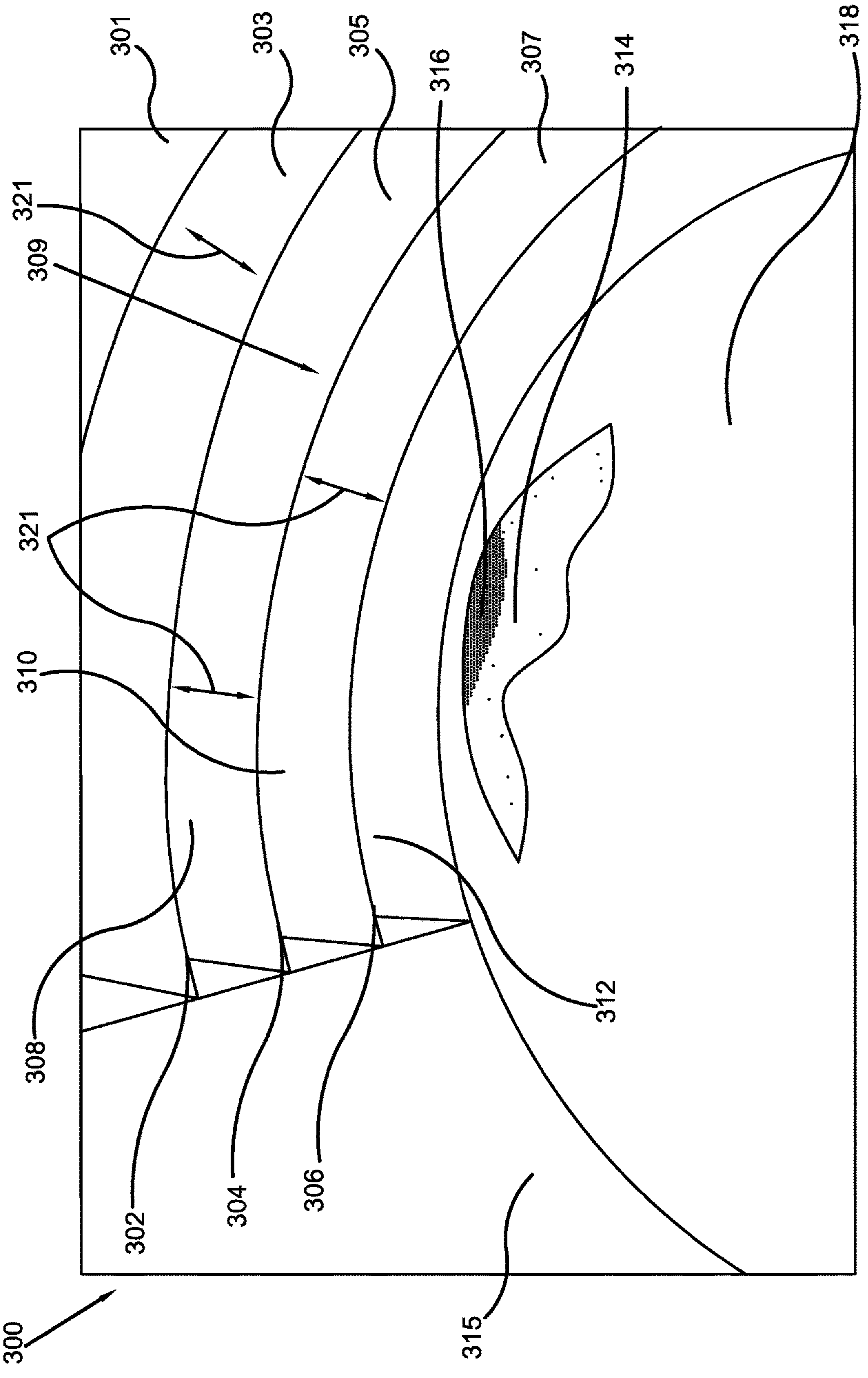
FIG. 3 illustrates an enlarged view of the riffles disposed in the gold pan of the present invention in accordance with the disclosed architecture.

FIG. 3 illustrates an enlarged view of another embodiment of a gold pan 300 of the present invention in accordance with the disclosed architecture. As shown in FIG. 3, a plurality of ripples 309 includes four ridges 301, 303, 305, 307 formed in the pan 300. Each of the four ridges 301, 303, 305, 307 include a lip and a cavity. The plurality of ridges, lips, and cavities are designed to trap gold. As shown, each ridge 303, 305, 307 includes a lip 302, 304, 306 and a cavity 308, 310, 312, respectively. Each ridge 303, 305, 307 and each lip 302, 304, 306 extends from the curved sidewall 315 of the pan 300. As illustrated, the lips 302, 304, 306 form or border the pockets or cavities 308, 310, 312 for trapping gold. It should be noted that preferably, the pan 300 can have three or four riffles, enabling a user to perform effective panning for better yield of gold. It should be noted that the pan 300 can be used for retrieving other valuable heavy metals, ores, minerals, etc. and generally used for separating lighter materials from heavier materials. The black sand 314 including the gold 316 is disposed onto or towards the base 318 for easy retrieval during the panning process 100. The plurality of ridges 303, 305, 307 are oriented as parallel curves or offset curves that are equidistant from one another. In one exemplary arrangement, the spacing 321 between the curvilinear parallel lips 302, 304, 306 is from about 1.4 cm to about 1.8 cm. Similar to the illustration in FIG. 2, it is to be appreciated that the plurality of ridges 303, 305, 307 include a curvilinear length of extension from about 25 percent to about 50 percent around a circumference of the curved sidewall 315 of the pan 300. In another embodiment, it is to be appreciated that the plurality of ridges 303, 305, 307 can include a curvilinear length of extension from about 30 percent to about 40 percent around the circumference of the curved sidewall 315 of the pan 300.

The gold pan 200, 300 of the present invention provides for faster panning, more effective panning, fewer panning steps, fewer of the heavier materials get washed out, faster finishing, easier to learn, and simpler motions that do not require advanced technique and constant monitoring.

Figure 4:
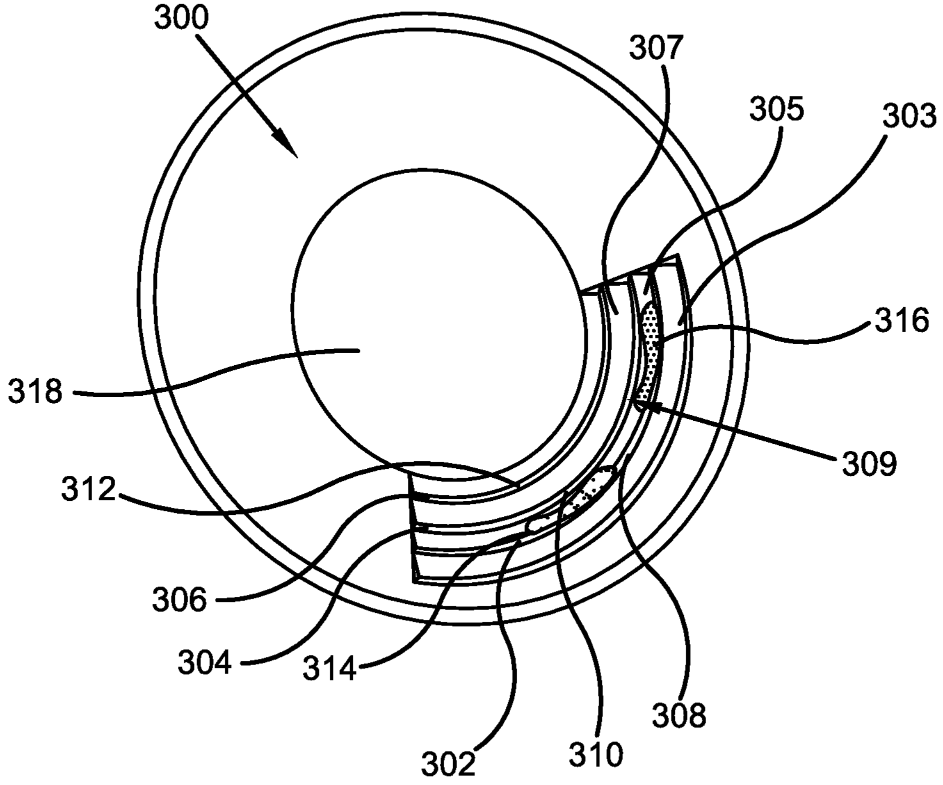
FIG. 4 illustrates a perspective view of the gold pan with the black sand and the gold trapped in the ridges in accordance with the disclosed architecture.

FIG. 4 illustrates a perspective view of the gold pan 300 with the black sand 314 and the gold 316 trapped in the ridges in accordance with the disclosed architecture. The plurality of ripples 309 are designed to help the pan 300 maintain and retain the gold particles while the rocks, gravels, and more are rinsed off from the pan 300. Even with vigorous circulating of the pan 300, the black sand 314 and the gold 316 are trapped inside the cavities or pockets 308, 310, 312 of the plurality of ripples 309 and can be disclosed onto or towards the base 318 as illustrated in FIG. 3 for a better yield.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "circular gold panning pan", "gold pan", "pan", and "gold panning pan" are interchangeable and refer to the circular gold panning pan 200, 300 of the present invention.

Notwithstanding the forgoing, the circular gold panning pan 200, 300 of the present invention can be of any suitable size and configuration as is known in the art without affecting the overall concept of the invention, provided that it accomplishes the above-stated objectives. One of ordinary skill in the art will appreciate that the circular gold panning pan 200, 300 as shown in the FIGS. are for illustrative purposes only, and that many other sizes and shapes of the circular gold panning pan 200, 300 are well within the scope of the present disclosure. Although the dimensions of the circular gold panning pan 200, 300 are important design parameters for user convenience, the circular gold panning pan 200, 300 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A pan for panning minerals comprising:

a circular pan having an outer rim, a sidewall, a base, and a plurality of riffles;

wherein said sidewall extends from said outer rim to said base;

wherein each of said plurality of riffles comprises a ridge, a lip, and a cavity;

wherein said outer rim having a rim diameter and said base having a base diameter;

wherein a ratio of said outer rim diameter to said base diameter is from 2.75 to 1.5;

wherein said outer rim diameter is from 36 cm to 44 cm;

wherein said base diameter is from 16 cm to 24 cm;

wherein the circular pan is a metal pan; and wherein each cavity is a low pressure pocket formed in the sidewall and is configured to retain and collect a material within the respective cavity when a mixture of different specific gravity materials are circulated within the circular pan.

2. The pan for panning minerals of claim 1, wherein said sidewall having a height from 7 cm to 10 cm.

3. The pan for panning minerals of claim 2, wherein said ratio of said outer rim diameter to said base diameter is from 2.25 to 1.75.

4. The pan for panning minerals of claim 2, wherein said ratio of said outer rim diameter to said base diameter is from 2.1 to 1.9.

5. The pan for panning minerals of claim 2, wherein said ridges are four ridges.

6. The pan for panning minerals of claim 5, wherein said four ridges are arranged in equidistant parallel curves.

7. The pan for panning minerals of claim 6, wherein a distance between said equidistant parallel curves is from 1.4 cm to 1.8 cm.

8. The pan for panning minerals of claim 6, wherein a distance between said equidistant parallel curves is from 1.5 cm to 1.7 cm.

9. The pan for panning minerals of claim 7, wherein said four ridges include a curvilinear length of extension from 25 percent to 50 percent around a circumference of said sidewall.

10. A pan for panning minerals comprising:

a circular pan having an outer rim, a sidewall, a base, and a plurality of riffles;

wherein said sidewall extends from said outer rim to said base;

wherein each of said plurality of riffles comprises a ridge, a lip, and a cavity;

wherein said outer rim having a rim diameter and said base having a base diameter;

wherein a ratio of said outer rim diameter to said base diameter is from 2.25 to 1.75;

wherein said outer rim diameter is from 36 cm to 44 cm;

wherein said base diameter is from 16 cm to 24 cm;

wherein said sidewall having a height from 7 cm to 10 cm;

wherein said ridges are four ridges; and further wherein said four ridges are arranged in equidistant parallel curves;

wherein the circular pan is a metal pan; and wherein each cavity is a low pressure pocket formed in the sidewall and is configured to retain and collect a material within the respective cavity when a mixture of different specific gravity materials are circulated within the circular pan.

11. The pan for panning minerals of claim 10, wherein a distance between said equidistant parallel curves is from 1.4 cm to 1.8 cm.

12. The pan for panning minerals of claim 10, wherein a distance between said equidistant parallel curves is from 1.5 cm to 1.7 cm.

13. The pan for panning minerals of claim 12, wherein said four ridges include a curvilinear length of extension from 25 percent to 50 percent around a circumference of said sidewall.

14. A pan for panning gold minerals comprising:

a circular pan having an outer rim, a curved sidewall, a base, and a plurality of riffles;

wherein said curved sidewall extends from said outer rim to said base;

wherein said plurality of riffles extending along said curved sidewall;

wherein each of said plurality of riffles comprises a ridge, a lip, and a cavity;

wherein said outer rim having a rim diameter and said base having a base diameter;

wherein said outer rim diameter is from 36 cm to 44 cm;

wherein said base diameter is from 16 cm to 24 cm;

wherein said sidewall having a height from 7 cm to 10 cm;

wherein said ridges are selected from three ridges and four ridges;

wherein said ridges are arranged in equidistant parallel curves; and further wherein said ridges include a curvilinear length of extension from 30 percent to 40 percent around a circumference of said sidewall;

wherein the circular pan is a metal pan; and wherein each cavity is a low pressure pocket formed in the sidewall and is configured to retain and collect a material within the respective cavity when a mixture of different specific gravity materials are circulated within the circular pan.

15. The pan for panning gold minerals of claim 14, wherein a distance between said equidistant parallel curves is from 1.4 cm to 1.8 cm.

16. The pan for panning gold minerals of claim 15, wherein a ratio of said outer rim diameter to said base diameter is from 2.25 to 1.75.

17. The pan for panning gold minerals of claim 14, wherein said ratio of said outer rim diameter to said base diameter is from 2.1 to 1.9.

* * * * *